United States Patent [19]

Purcell

[11] 4,130,531

[45] Dec. 19, 1978

[54] HIGH SOLIDS, LOW VISCOSITY THERMOSETTING PHENOLIC/EPOXY COATING SYSTEM

[75] Inventor: Frederick C. Purcell, Johnstown, Ohio

[73] Assignee: Ashland Oil, Inc., Ashland, Ky.

[21] Appl. No.: 624,819

[22] Filed: Oct. 22, 1975

Related U.S. Application Data

[63] Continuation-in-part of Ser. No. 519,507, Oct. 31, 1974, abandoned, and Ser. No. 571,979, Apr. 28, 1975, abandoned.

[51] Int. Cl.$^2$ ............................ C08J 3/24; C08K 5/04; C08L/61/04; C08L 63/00
[52] U.S. Cl. ..................... 260/31.4 EP; 260/32.8 EP; 260/33.4 EP; 260/33.6 EP; 260/830 TW; 260/831; 260/835
[58] Field of Search ................. 260/32.8 EP, 33.4 EP, 260/31.4 EP, 33.6 EP, 47 EP, 58 EP, 830 TW, 835, 831

[56] References Cited

U.S. PATENT DOCUMENTS

| | | | |
|---|---|---|---|
| 2,944,996 | 7/1960 | Berenbaum et al. | 260/835 |
| 3,291,856 | 12/1966 | Tringali et al. | 260/831 |
| 3,663,354 | 5/1972 | Ueno et al. | 260/831 |
| 3,730,865 | 5/1973 | Kapalko et al. | 260/831 |
| 3,876,615 | 4/1975 | Vargiu et al. | 260/47 EP |
| 3,945,972 | 3/1976 | Sakamoto | 260/47 EP |

OTHER PUBLICATIONS

Lee et al., "Handbook of Epoxy Resins", pp. 13–18 thru 13–20 and pp. 24–28 thru 24–33, 1970.

*Primary Examiner*—Allan Lieberman

[57] ABSTRACT

A high solids coating composition obtained by mixing a low viscosity dimethylol phenol, a methylene bisphenol, an epoxy containing reactant, a polyol and an amine catalyst all dissolved in sufficient organic solvent to provide for easy application but having less than 25 volume percent of solvent.

20 Claims, No Drawings

HIGH SOLIDS, LOW VISCOSITY THERMOSETTING PHENOLIC/EPOXY COATING SYSTEM

REFERENCE TO PRIOR APPLICATION

This is a continuation-in-part of copending application Ser. No. 519,507, filed Oct. 31, 1974 and Ser. No. 571,979 filed Apr. 28, 1975 both now abandoned.

BACKGROUND OF THE INVENTION

Phenolic and epoxy resins are well known to the coatings industry. In some cases, in order to obtain the best properties of each system, phenolic resins and epoxy resins are used as mixtures, achieving thereby the most advantageous combination of chemical resistance and flexibility. This approach has been used with success to provide serviceable internal coatings for cans (Whitehouse, Phenolic Resins, American Elsevier 1968, p. 134). The rigorous coating properties required for this use have heretofore been met by the use of relatively high molecular weight phenolic resins in admixture with high molecular weight epoxy resins of the bis-phenol/epichlorohydrin condensation type. These two resins are usually mixed in up to approximately 75% epoxy 25% phenolic (Phenolic Resins p. 28). In order to obtain coatings systems which can be conveniently applied by conventional techniques such as roller coating, the resin must be of sufficiently low viscosity. For use in the can industry, viscosities in the order of 100–1000 cps are advisable. This restriction requires the use of significant amounts of solvent to dissolve the high molecular weight components, resulting in solutions of 25–45% solids. The use of this high level of solvent is wasteful, environmentally undesirable and expensive.

SUMMARY OF THE INVENTION

This invention involves the combination of previously known compositions in such a manner that acceptable coating properties are obtained from a resin solution of higher solids than previously available. This combination involves two liquid phenolic components, a liquid epoxy component, a polyol, a catalyst and a solvent. One phenolic component is a low molecular weight dimethylol phenol. The second phenolic component is a low molecular weight methylenebis phenol. The liquid epoxy component is an aliphatic epoxy compound or an epoxy compound containing aromaticity or mixtures thereof. The polyol is a low molecular weight, normally liquid low viscosity compound containing at least two hydroxy groups per molecule. The amine catalyst is one of those catalysts known to the art for crosslinking of phenolic/epoxy systems. These components when dissolved in less than 25 volume percent of an organic solvent, provide a coating system of a viscosity compatible with currently used application techniques while retaining the high performance characteristics of the high molecular weight, low solids systems.

DESCRIPTION OF THE PREFERRED EMBODIMENTS

In order to obtain the low viscosity of the resin components which in turn allows a large reduction in the amount of solvent necessary to obtain a system with usable viscosity, low molecular weight components are required. However, these components must have the ability to rapidly gain in molecular weight during cure so that the overall cure time is not extended beyond industry requirements and that no sacrifice in the film properties of chemical resistence and flexibility are produced.

One of the phenolic components (Component a) is an oil soluble heat reactive crosslinker containing a high concentration of alkyl dimethylol phenols of the structure:

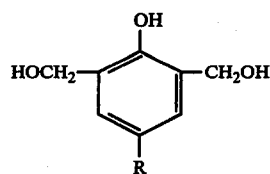

(a)

The amine catalyzed reaction of formaldehyde and an alkyl phenol proceeds stepwise with first the addition of one mole formaldehyde to form a methylol phenol. A second methylol group is then generated by reaction of another mole of formaldehyde. Additional heating will adversely cause condensation of additional moles of substituted phenol via ether formation to a benzylic ether.

Since this type dimer, or higher condensation products formed by additional etherification reactions will have a higher viscosity than the monomer of (a), it is desirable to have the maximum amount of (a) present. It is believed that the presence of significant amounts of the dimethylol phenol must be present in component (a) in order to obtain a coating composition. Although the viscosity can be reduced by careful selection of the other components, the presence of the dimethylol phenol of Structure 1 is beneficial in obtaining low viscosity. The alkyl phenol used in the preparation of component (a) may have the alkyl substituent in ortho, meta or para position of the phenol molecule. However, the preferred starting material is the ortho or para alkyl phenol because of the easier availability of this material, and also the higher level of activity of the ortho and para alkyl phenols toward condensation with formaldehyde. The alkyl chain R can consist of any configuration of 1 to 16 carbon atoms and hydrogen with the restriction that the resulting dimethylol phenol have low enough viscosity that the final composition of the invention has a viscosity below 1500 cps. Other groups may be included in the alkyl chain, such as ester groups, nitrile, sulfone, either to enhance the fluidity of the composition or the properties of the cured film. This oil soluble phenolic component is produced by the amine catalyzed condensation of an alkyl phenol with formaldehyde at a phenol to formaldehyde ratio of from 1.0–1.8 to 1.0–2.3. This component, while heat reactive, will not cure by itself to give a polymer useful in the present invention; a second phenolic component is necessary.

This second component (Component (b) is a low molecular weight phenol formaldehyde condensation product produced by the reaction of USP phenol with formaldehyde or more preferably USP phenol and an alkyl phenol with formaldehyde, where the ratio of the phenolic reactant to formaldehyde is from 1.0–0.5 to 1.0–0.75. Although all the various possible products are probably present in the condensation product, the product should contain a high percentage of the mixed phenol-cresol product shown in the structure:

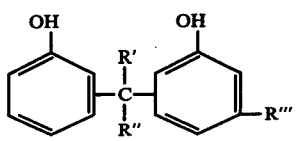

Polycondensation should be minimized to retain low viscosity, and the presence of both the substituted and unsubstituted phenol in the same molecule contribute to the high desired reactivity. R''' of (b) may be hydrogen or alkyl. When R''' is alkyl, it may, as for Component a, consist of any configuration of 1 to 16 carbon atoms and hydrogen. Other groups may also be incorporated into the chain, such as ester, nitrile, sulfone and ether. The R''' group may be ortho, meta, or para to the phenolic hydroxy, but the usual configuration finds the alkyl group in the ortho or para position.

The alkylene bridge may be ortho or para to the phenolic hydroxy. The point of attachment is controlled by the reaction conditions during the formaldehyde phenol condensation reaction. Acidic or base catalysis tends to cause reaction at both ortho and para positions, while some bivalent metal oxides or weak acid salts of bivalent metal catalysts tends to favor ortho substitution. While substitution at either position gives applicable compounds it has been found that compounds having the alkylene bridge ortho to the phenolic hydroxy gives lower viscosity to the final coating composition.

The alkylene bridge is produced by the reaction of aldehydes or ketones with the phenol under conditions well known in the art. The reaction can be catalyzed by amines or metallic hydroxides or inorganic acids. In the cases where metallic hydroxides or inorganic acids are used, the residual catalyst must normally be removed by washing the product, since residual catalyst will cause reduced adhesion to metal substrates especially in the presence of hot water. It is therefore preferred to prepare component (b) with ammonia catalyst; in this procedure the nitrogen becomes permanently bound in the phenolic resin, but is still available to serve in this combined form as the curing amine catalyst for the coating composition. R' and R'' of component (b) can be hydrogen or alkyl groups with any configuration of 1 to 4 carbon atoms, with the restriction that the viscosity of the resulting composition must be below 1500 cps. Other organic groups may be included, such as nitrile, ester, ether, and sulfone. 4-Keto pentanoic acid ester is an example of such an ester-containing group, leading to the structure shown:

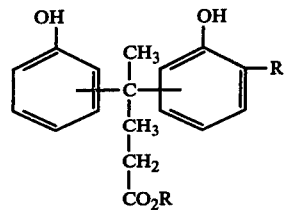

Component (b) will not cure by itself; in an admixture with Component (a), a rapid condensation can be obtained by the use of an amine catalysis at elevated temperature.

The epoxy component (Component c) provides flexibility and enhanced alkali resistance to the coating of this invention. This epoxy is low molecular weight in the range of 130–200 per epoxide group. The epoxy compound may be either aromatic, aliphatic, or mixtures of the two types. It has been found that the aliphatic low viscosity epoxy compounds give excellent results in this invention when used alone. Examples of this type of epoxy are the triglycidyl ester of trimethylol propane (Reichhold STF-6); aliphatic polyglycidyl ether (Celanese EPI-REZ 5042); aliphatic triglycidyl ether (Celanese EPI-REZ 5044). However, inclusion of epoxy compounds containing aromasticity have been found to increase the toughness of the film and also to lower the overall cost of the epoxy component. An example of an aromatic epoxy are the diglycidyl ethers of bis p, p hydroxyphenyl propane (Shell Epon 828, Celanese EPI-REZ 510).

The non-volatile polyol (Component d) used as a reactive diluent, performs the dual purpose of lowering the viscosity of the resin prior to cure and also improves the flexibility of the finished cured coating. Its volatility must be such that it will not volatize significantly at the curing temperature. The hydroxy groups of this polyol must be of sufficient reactivity to allow condensation with either the epoxy or the phenolic components. The amounts of this polyol needed depends on the flexibility of the phenolic and epoxy component selected, and may vary from 3–25 weight percent. Representative polyols useful as component (d) in this invention are those shown in Table 1. Also shown in this table is the percentage remaining after heating the polyol at 400° F. for 10 minutes in an air circulating oven along with other property information.

TABLE I

| Product | Solids 10 min. at 400° F | OH Value | Viscosity | Supplier |
|---|---|---|---|---|
| PCP-0300[1] | 92% | 310 | 14.5 stokes | Union Carbide |
| 2 TMP, 1 Adipic Polyester | 80.7% | 568 | 440 stokes | Ashland |
| Miltron R 16[2] | 87.0% | 44 | 104.1 stokes | Mobay |
| Miltron R 18[2] | 93.5% | 60 | 147 stokes | Mobay |

[1]Trimethylolpropane-epsilon caprolactone - Union Carbide
[2]Mobay, slightly branched hydroxy (OHV 44-60) polyester Compounds of highest interest for use as polyols are polyester polyols, polyether polyols and high molecular weight diols. Olefin oxides and epoxidized oils, since they will perform as glycol anhydrides, may also be used as the polyol.

In another embodiment of this invention, epoxy groups and hydroxy groups may both be incorporated into the same polymeric structure and serve as the epoxy and the polyol component. For example, a hydroxy-terminated polyester partially reacted with an epoxy containing compound will result in a hydroxy-epoxy containing polyester. This epoxy polyol, either as is or mixed with additional epoxy compound, when mixed with the phenolic components previously described, produces a film-former within the scope of this invention.

Organic solvents suitable for use in this invention are those with sufficient solvency for the components, but with volatility low enough that they do not "flash" off before allowing the film to level for best performance and appearance. Alcohols such as anhydrous isopropanol, ketones such as isohorone, esters such as butylcellosolve acetate, aromatics such as xylene are all usable either individually or as mixtures. The solvent is used to an extent of no more than 25 volume percent of the organic portion of the coating, excluding fillers and water. The solvent composition is selected so that the completely formulated coating has a viscosity of between 100 and 1500 cps, preferably between 200 and 800 cps. The viscosity measurements, unless otherwise indicated, are made using a Brookfield Viscosimeter RVT, Spindle 3 at 50 rpm.

Other additives may be added to enhance the film properties and whose use is known to those skilled in the art, including flow and leveling agents such as silicone resins or Modaflow (Monsanto). If it is found necessary to add a catalyst for the cure, suitable amines include triethanolamine, triethylamine, triethylenediamine and other similar amines.

EXAMPLES

Examples of the practice of this invention are Examples 1-20. The references to the percent solids in the examples include the water resulting from the reaction and may be lower than 80%. However, the non-reactive organic solvent, as a percent of the anhydrous composition, is readily apparent from the formulations shown.

EXAMPLE 1

Preparation of phenolic Component (a) phenolic crosslinker
A. Nonyl Phenol: 1125 grams
B. Paraformaldehyde: 350 grams
C. 29% NH$_3$ aqueous: 35 grams A, B and C were charged into a 2 liter pressure reactor and heated with agitation to 120° C. under 40 lbs. pressure. At the end of 2½ hrs., at 40 lbs. pressure, the reactor was cooled at 90° C. and the resin was held under 25 inches of vacuum until clear, about 20 minutes.

EXAMPLE 2

Preparation of phenolic Component (b)
A. Ortho cresol: 500 grams
B. USP Phenol: 1000 grams
C. 37% Formaldehyde: 700 grams
D. 29% NH$_3$ aqueous: 50 grams 500 grams of A, 500 grams of C and 30 grams of D were charged into a three liter round bottom reaction vessel with agitation and reflux condenser. The reactants were heated to 100° C. and held under reflux for 20 minutes. At the end of 20 minutes, B was added and the remainder of C and D. The vessel was again heated to reflux and held for 2 hours. At the end of 3 hours, vacuum was applied and 650 mls of H$_2$O was removed.

EXAMPLES 3–8

Preparation of coating systems of this invention.

| MIX | 3 | 4 | 5 | 6 | 7 | 8 |
|---|---|---|---|---|---|---|
| Phenolic Cook Example 1 | 30 | 20 | 20 | 15 | 10 | 12½ |
| Phenolic Cook Example 2 | 30 | 40 | 35 | 35 | 25 | 30 |
| Epoxy Resin EPI-REZ 510 | 10 | 10 | 10 | 10 | 10 | 10 |
| Epoxy Resin EPI-REZ 5042 | 10 | 10 | 15 | 20 | 25 | 25 |
| PCP-0300 Polyol | 5 | 5 | 5 | 10 | 15 | 12½ |
| Butyl Cellosolve Acetate | 10 | 10 | 10 | 10 | 10 | 10 |
| Isophorone | 5 | 5 | 5 | — | — | — |
| Isopropanol | 5 | 5 | — | — | — | — |
| Silicone Resin | 0.5 | 0.5 | 0.5 | 0.5 | 0.5 | 0.5 |
| Triethanolamine | 0.1 | 0.1 | 0.1 | 0.1 | 0.1 | 0.1 |

The above mixtures were drawn down on tin plate and baked for 10 minutes at 400° F. in an air circulating oven. Samples 5, 6, 7 and 8 were all found to produce films with excellent flexibility and good resistance to solvents such as MEK rub. Ratio 8 was considered to be the best. It had a viscosity of 10.3 stokes (Gardner Holt) at 77.5% solids. Film thickness on baked panels ranged from 0.1 to 1.0 mils.

EXAMPLE 9

Example 9 is similar to Example 1 with the exception that dodecyl phenol was substituted for nonyl phenol and was run according to the following procedure:
A. Dodecyl Phenol: 1060
B. 37% Formaldehyde: 700
C. 29% NH$_3$ aqueous: 60

A, B and C were charged into a three liter flask equipped with agitation and reflux condenser. The reactants were held for 4 hours at 70° C. At the end of 4 hours, vacuum was applied and 520 mls. of water were removed.

EXAMPLE 10

The phenolic component (Component a) of Example 9 was used with Component b of Example 2 as follows:
Phenolic Cook Example 9: 12½
Phenolic Cook Example 2: 30
Epoxy ER-510: 10
Epoxy ER-5042: 25
PCP-0300: 12½
Butyl Cellosolve Acetate: 10
L-5310: 0.5
Triethanolamine: 1.0

This formulation had a viscosity of 9.1 stokes (Gardner Holt) at 74.5% solids. The resin mixture was found to produce a film with excellent flexibility and good MEK rub resistance when panels were baked for 10 minutes at 400° F. Film thickness ranged from 0.1 mils. to 1.0 mil.

EXAMPLE 11

Phenolic (Component a) was prepared in similar manner to Example 1 according to the following procedure:
A. Octyl phenol: 925
B. 37% Formaldehyde: 700
C. 29% NH$_3$ Aqueous: 60

Components A, B and C were charged into a 3 liter flask with agitation and condenser. The reactants were heated to 65° to 70° C. for 4 hours. Following the 4 hours of reaction, the resin was cooled to 55° C. and full vacuum was applied. The resin was heated until full vacuum was reached at 70° C. yielding a clear resin.

EXAMPLE 12

The phenolic Component a of Example 11 was formulated with the phenolic of Example 2 as follows:
- Phenolic Example 11: 12½
- Phenolic Example 2: 30
- Epoxy ER-510: 10
- Epoxy ER-5042: 25
- PCP-0300: 12½
- Butyl Cellosolve Acetate: 7½
- Butanol: 2½
- Silicone Resin L-5310: 0.5
- Triethanolamine: 1.0

When the formulation of Example 12 was drawn down on tin plate, it was found to have good flexibility and good MEK rub resistance. Viscosity 8.7 stokes at 71.2% solids.

EXAMPLE 13

The phenolic (Component b) was prepared in a manner similar to Example 2, according to the following procedure:
- A. Ortho Cresol: 1350
- B. 37% Formaldehyde: 1000
- C. 29% $NH_3$ aqueous: 60
- D. USP Phenol: 1175
- E. 37% Formaldehyde: 250
- F. 29% $NH_3$ aqueous: 30

Components A, B and C were charged into a 5 liter reactor and upheated. The reactants were held for 45 minutes under reflux conditions with good agitation and complete condensate return from a reflux condenser. At the end of 45 minutes, components D, E and F were added. Again, the components were heated to reflux and held for 2 hours followed by 1 hour of atmospheric distillation and then low vacuum. The resin was finally allowed to reach 100° C. under full vacuum just before discharge. 1100 mls. of water were removed.

EXAMPLE 14

The phenolic of Example 13 was formulated with the phenolic of Example 11 as follows:
- Phenolic Cook Example 11: 23 grams
- Phenolic Cook Example 13: 28 grams
- PCP-0300: 7.5 grams
- Butyl Cellosolve Acetate: 5 grams
- Isophorone: 5 grams
- Butanol: 5 grams
- Triethanolamine: 1.0 grams
- L-5310: 0.5 grams
- EPI-REZ 510: 7.5 grams
- ER-5042: 22.5 grams This formulation had a viscosity of 7.4 stokes (Gardner Holt) at 70±1% solids. The formulation of this example was found to have excellent flexibility when baked on tin plate and good MEK rub resistance. It was run through a pasturization test and a field usage test that consisted of being held at 250° F. for 90 minutes in contact with commercial dog food. It passed all of the physical property requirements for an interior can lining.

EXAMPLE 15

- Phenolic Example 11: 19
- Phenolic Example 2: 22
- 2 TMP, 1 Adipic polyester: 9.5
- Butyl Cellosolve Acetate: 5
- Isophorone: 5
- Butanol: 5
- Triethanolamine: 1
- Silicone Resin L-5310: 0.5
- EPI-REZ-510 Celanese: 9.0
- EPI-REZ-5042 Celanese: 24

The formulation of this example was drawn down on tin plate and baked for 10 minutes at 400° F. Film thickness was from 0.1 to 0.3 mils thick.
- Viscosity of Mix: 7.8 stokes
- Compatibility: Good
- MEK Rub on Panels: 175 MEK rubs to failure
- Wedge Bends and Impact (treated with Copper Sulfate to show flaws in film): Good
- Dog Food Test (90 min. at 250° F.): Passed — Good

EXAMPLE 16

- Phenolic Cook Example 11: 19
- Phenolic Cook Example 2: 22
- Multron R18 (Mobay): 9.5
- Butyl Cellosolve Acetate: 5
- Isophorone: 5
- Butanol: 5
- L-5310: 0.5
- Triethanolamine: 1.0
- EPI-REZ-510: 9.0
- EPI-REZ-5042: 24.0

The formulation of this example was drawn down on tin plate and baked for 10 minutes at 400° F. Film thickness were from 0.1 to 0.3 mils thick.
Test data on formulation of Example 16:
- Viscosity of Mix: 8.2 stokes
- Compatibility of Mix: Good
- MEK Rubs: 17 to failure
- Impact and Wedge Bends: Good
- Dog Food Test (90 min. at 250° F.): Passed

EXAMPLE 17

- Phenolic Cook Example 11: 19
- Phenolic Cook Example 2: 22
- Multron R16 (Mobay): 9.5
- Butyl Cellosolve: 5
- Isophorone: 5
- Butanol: 5
- L-5310: 0.5
- Triethanolamine: 1.0
- EPI-REZ-510 Celanese: 9.0
- EPI-REZ-5042 Celanese: 24.0

The formulation of this example was drawn down on tin plate and baked for 10 minutes at 400° F. Film thicknesses were from 0.1 mils to 0.3 mils thick.
Test data for the formulation of Example 17 is as follows:
- Viscosity of Mix (Gardner Holt): 8.4 stokes
- Compatibility of Mix: Good
- MEK Rubs: 18 to failure
- Wedge Bend and Impact: Good
- Dog Food Test (90 min. at 250° F.): Passed

EXAMPLE 18 (No Polyol)

- Phenolic Cook Example 11: 19
- Phenolic Cook Example 2: 22
- Butyl Cellosolve Acetate: 5
- Isophorone: 5
- Butanol: 5
- L-5310: 0.5

Triethanolamine: 1.0
EPI-REZ-510: 9.0
EPI-REZ-5042: 24.0

The formulation of this example was drawn down on tin plate and baked for 10 minutes at 400° F. Film thicknesses ranged from 0.1 mils to 0.3 mils.

Test data on formulation of example 18 is as follows:
Viscosity of mix: 5.9 stokes
Compatability of mix: Good
MEK Rubs: 500 to failure
Wedge bend impact: Good
Dog Food Test: Failure

EXAMPLE 19

Adipic acid (444 parts by weight) and ethylene glycol (247 parts) were esterified under inert gas, and temperature of 200° C. until the polyester had an acid value of 5–10, a hydroxyl number of 160–180, and a viscosity of 8–16 stokes. The reaction mixture was then cooled to 170° C. and diglycidyl ether of p,p-dihydroxydiphenylmethane (410 parts) was added. The temperature was raised to 210° C., and the reaction was continued at this temperature until the viscosity reached 130–150 stokes and the oxirane value was 2.1–2.3. The reaction mixture was then cooled to 100° C., and additional diglycidyl ether of p.p-dihydroxydiphenylmethane (528 parts) was added. A coating system containing this epoxy polyol composition was formulated as follows:

Epoxy-polyol (prepared in Example 19): 100 parts by weight
Phenolic component (a) as modified in Example 11: 51 parts
Phenolic component (b): 78 parts
Ethylene diamine: .7
Isophorone: 2
Ethyl benzene: 8
Primary amyl acetate: 20
Ethyl amyl ketone: 20

Volume percent solvent in this system was 22.7. This coating, deposited on panels and baked at 204° C. for 10 minutes, gave a 0.3 mil dry film. The properties of this baked film were as follows:

| Test | Comments |
|---|---|
| Wedge Bend | Excellent Film Integrity at bend |
| Impact, Gardner, in/lb | Passes 20 - front and reverse |
| MEK Rubs (25) | No Effect |
| Cross Hatch Adhesion, % pass | 100 |
| Gloss | Excellent |
| Hardness | Excellent |
| Abrasion Resistance | Good |
| Baked Film Color | Good |
| Color Retention | Fair |
| Solvent Resistance | Good |
| 24 Hr. Spot Test | |
| Xylene | No Effect |
| Solox | No Effect |
| Acetone | No Effect |
| 15% H$_2$SO$_4$ | No Effect |
| 20% NAOH | Very Slight Effect |

EXAMPLE 20

The procedure of Example 19 was followed except that the amount of additional diglycidyl ether which was added was 180 parts instead of 528. The percent polyol in Example 20 is 22%. The formulation was the same as for Example 19. This system was deposited on panels and baked at 204° C. for 10 minutes, gave a 0.3 mil dry film with the following properties:

| Test | Comment |
|---|---|
| Wedge Band | Fair to good Film Integrity at Bend |
| Impact, Gardner, in/lb | Passes 20 - front and reverse |
| MEK Rubs (25) | Failure at 20 double rubs |
| Cross Hatch Adhesion, % pass | 100 % |
| Gloss | Good |
| Hardness | Good |
| Abrasion Resistance | Good |
| Baked Film Color | Good |
| Color Retention | Fair |
| Solvent Resistance | Fair |

What is claimed is:

1. A curable coating composition having a viscosity of between 100 and 1000 cps comprising:
   (a) a normally liquid phenolic component consisting essentially of alkyl dimethylol phenol of the structure:

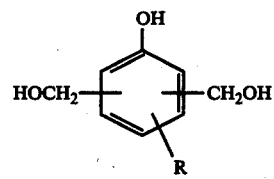

where R is an alkyl group containing 1–16 carbon atoms in the para or ortho position and where the methylol groups are in the 2 remaining ortho and para positions;
   (b) a normally liquid phenolic component consisting essentially of an alkylene phenol of the structure:

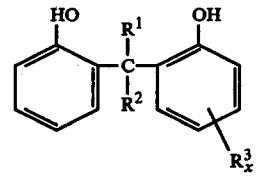

where $R^1$ and $R^2$ are methyl or hydrogen, x is 1 or 2 and $R^3$ is an alkyl group containing 1–16 carbon atoms;
   (c) a normally liquid 1,2 - epoxy component consisting of an aliphatic epoxy compound, an epoxy compound containing aromaticity or mixtures thereof and having an epoxy equivalent of between 130 and 200;
   (d) 3–25% of the combined weight of (a), (b), (c) and (d) of a non-volatile polyol;
   (e) less than 25% of the combined volume of (a), (b), (c), (d) and (e) of a non-reactive organic solvent; and
   (f) an amine catalyst.

2. The composition of claim 1 where the $R^3$ group of component (b) is methyl and is ortho to the phenolic hydroxy and where the R and CH$_2$OH groups of component (a) are para and ortho respectively to the phenolic hydroxy.

3. The composition of claim 2 where $R^1$ and $R^2$ are hydrogen.

4. The composition of claim 3 where R of component (a) is an aliphatic alkyl group with 1–16 carbon atoms.

5. The composition of claim 3 where the component (c) is a mixture of epoxy compounds containing aromaticity with an aliphatic epoxy compound.

6. The composition of claim 2 where the viscosity of the composition is between 300 and 800 cps.

7. The composition of claim 1 where the weight percentages excluding solvent are 20 to 70% for component (a); 5–60% for component (b); 5–60% for component (c); 5–25% for component (d).

8. The composition of claim 4 where the weight percent composition excluding solvent is 20 to 70% component (a); 5–60% component (b); 5–60% component (c); 10–20% component (d); and where the viscosity of the resulting composition is between 100 and 500 cps.

9. A curable coating composition having a viscosity of between 100 and 1500 cps comprising:
(a) a normally liquid phenolic component consisting essentially of alkyl dimethylol phenol of the structure:

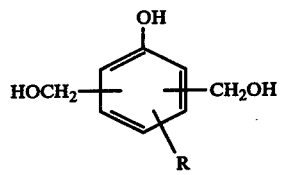

where R is an alkyl group containing 1–16 carbon atoms in the ortho or para position and where the methylol groups are in the 2 remaining ortho and para positions:
(b) a normally liquid phenolic component consisting essentially of an alkylene phenol of the structure:

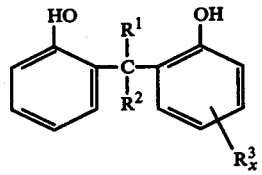

where $R^1$ and $R^2$ are methyl or hydrogen, x is 1 or 2 and $R^3$ is an alkyl group containing 1–16 carbon atoms;
(c) a normally liquid, 1,2 - epoxy component consisting of an aliphatic epoxy compound, an epoxy compound containing aromaticity or mixtures thereof and having an epoxy equivalent of between 130 and 200;
(d) a composition prepared by the partial reaction of a hydroxy-containing polyester and an oxirane containing compound where said composition contains both hydroxy and oxirane groups;
(e) less than 25% of the combined volume of (a), (b), (c), (d) and (e) of a non-reactive organic solvent; and
(f) an amine catalyst.

10. The composition of claim 9 where the $R^3$ group or component (b) is methyl and is ortho to the phenolic hydroxy and where the R and $CH_2OH$ groups of component (a) are para and ortho respectively to the phenolic hydroxy.

11. The composition of claim 10 where $R^1$ and $R^2$ are hydrogen.

12. The composition of claim 11 where R of component (a) is an aliphatic alkyl group with 1–16 carbon atoms.

13. The composition of claim 12 where the weight percent composition excluding solvent is 20 to 70% component (a); 5–60% component (b); 5–60% component (c) where part of (c) is used in the preparation of component (d); 5–25% hydroxy-containing polyester as component (d) at least part of which is prereacted with at least part of component (c);

14. The composition of claim 13 where component (d) is present in an amount of 10–18%.

15. The composition of claim 1 wherein (b) is obtained from phenol, formaldehyde, and o-cresol.

16. The composition of claim 1 wherein $R^3$ of (b) contains in the chain ester or nitrile or sulfone or ether group.

17. The composition of claim 1 wherein the alkylene bridge of (b) is ortho or para to the phenolic hydroxy.

18. The composition of claim 1 wherein the alkylene bridge of (b) is ortho to the phenolic hydroxy.

19. The composition of claim 1 wherein said amine includes triethanolamine or triethylamine or triethylenediamine.

20. A thermoset composition obtained by baking a substrate coated with the composition of claim 4 at 350°–450° F. until cured.

* * * * *